United States Patent
Benyahia

(10) Patent No.: US 9,475,000 B2
(45) Date of Patent: Oct. 25, 2016

(54) CARBON DIOXIDE MINERALIZATION USING REJECT BRINE

(71) Applicant: QATAR UNIVERSITY, Al Tarfa, Doha (QA)

(72) Inventor: Farid Benyahia, Doha (QA)

(73) Assignee: Qatar University, Doha (QA)

( * ) Notice: Subject to any disclaimer, the term of this patent is extended or adjusted under 35 U.S.C. 154(b) by 0 days.

(21) Appl. No.: 14/484,158

(22) Filed: Sep. 11, 2014

(65) Prior Publication Data

US 2016/0074806 A1    Mar. 17, 2016

(51) Int. Cl.
| | | |
|---|---|---|
| *B01D 53/62* | (2006.01) | |
| *C02F 1/72* | (2006.01) | |
| *C02F 1/52* | (2006.01) | |
| *B01D 53/78* | (2006.01) | |
| *C02F 101/10* | (2006.01) | |
| *C02F 103/08* | (2006.01) | |
| *C02F 103/18* | (2006.01) | |

(52) U.S. Cl.
CPC ............... *B01D 53/62* (2013.01); *B01D 53/78* (2013.01); *C02F 1/5236* (2013.01); *C02F 1/72* (2013.01); *B01D 2251/2062* (2013.01); *B01D 2258/0283* (2013.01); *C02F 2101/10* (2013.01); *C02F 2103/08* (2013.01); *C02F 2103/18* (2013.01)

(58) Field of Classification Search
CPC .................................. C01D 7/18; C01D 7/12
USPC ........................................................ 423/220
See application file for complete search history.

(56) References Cited

U.S. PATENT DOCUMENTS

| | | |
|---|---|---|
| 6,180,012 B1 | 1/2001 | Rongved |
| 8,486,182 B2 | 7/2013 | Sano et al. |
| 8,591,852 B2 | 11/2013 | Abu-Sharkh |
| 2010/0163471 A1* | 7/2010 | Elyanow ............ B01D 61/022 210/176 |
| 2011/0268633 A1* | 11/2011 | Zou ........................ C01C 1/164 423/181 |

FOREIGN PATENT DOCUMENTS

CN    101941719    *  5/2012    ............ C01C 1/02

OTHER PUBLICATIONS

Multah H. El-Nass (2011). Reject Brine Management, Desalination, Trends and Technologies, Michael Schorr (Ed.), ISBN: 978-953-307-311-8, InTech, pp. 237-252, accessed online at http://cdn.intechweb.org/pdfs/13761.pdf on Sep. 22, 2015.*
Machine Translation of CN 101941719 to Liu, et al.*

* cited by examiner

*Primary Examiner* — Daniel C McCracken
(74) *Attorney, Agent, or Firm* — Squire Patton Boggs (US) LLP

(57) ABSTRACT

Carbon dioxide ($CO_2$) mineralization using reject brine is a process that includes obtaining reject brine discharged from a desalination plant, contacting the reject brine with ammonia to form ammoniated brine, contacting $CO_2$ emitted from a chemical or power plant with the ammoniated brine to form sodium bicarbonate ($NaHCO_3$) and aqueous ammonium chloride ($NH_4Cl$) solution, and contacting the aqueous ammonium chloride ($NH_4Cl$) solution with calcium oxide (CaO) to form calcium chloride and releasing virtually all ammonia from the ammonium chloride ($NH_4Cl$) solution.

15 Claims, 5 Drawing Sheets

CARBON DIOXIDE MINERALIZATION USING REJECT BRINE

BACKGROUND OF THE INVENTION

1. Field of the Invention

The present invention relates to a process for the simultaneous reduction of carbon emission and desalination of reject brine, and particularly to carbon dioxide mineralization using reject brine that provides a process including reacting carbon dioxide captured from carbon emissions with sodium chloride in reject brine in the presence of ammonia.

2. Description of the Related Art

Climate change and strategies for greenhouse gas emission reduction have been the subject of intense debate on a global scale. While carbon capture and storage (CCS) is generally viewed as an appropriate strategy for reducing greenhouse gas emission, determining suitable storage mechanisms that do not compromise untapped or current hydrocarbon reservoirs is challenging. Alternative carbon management solutions are desirable where underground storage of $CO_2$ is not possible or feasible in the short to medium term. Carbon conversion is an integral part of a multiform carbon management option known as carbon capture, storage and utilization (CCSU). Carbon dioxide is a relatively stable molecule and its conversion is attractive if the accompanying energy requirements, environmental impacts, and economics are favorable. In view of these considerations, low temperature $CO_2$ conversion is a preferable carbon management solution.

A second environmental issue that needs to be addressed in many parts of the world is desalination of brine reject or reject brine that is discharged from desalination plants into the sea. A need therefore exists for a chemical process to reduce $CO_2$ emissions and discharge of reject brine into the sea, and simultaneously produce potentially marketable products.

Thus, carbon dioxide mineralization using reject brine solving the aforementioned problems are desired.

SUMMARY OF THE INVENTION

Carbon dioxide mineralization using reject brine is a process that includes obtaining reject brine discharged from a desalination plant, contacting the reject brine with ammonia to form ammoniated brine, contacting $CO_2$ emitted from a chemical or power plant with the ammoniated brine to form sodium bicarbonate ($NaHCO_3$) and aqueous ammonium chloride ($NH_4Cl$) solution, and contacting the aqueous ammonium chloride ($NH_4Cl$) solution with calcium oxide (CaO) to form a calcium chloride solution, thereby releasing virtually all ammonia from the ammonium chloride ($NH_4Cl$) solution.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Carbon dioxide ($CO_2$) mineralization using reject brine is a process that includes reacting $CO_2$ captured from chemical or power plant emissions with reject brine discharged from desalination plants to provide simultaneous mitigation of carbon emission and desalination of reject brine before the brine is discharged into the sea. $CO_2$ mineralization using reject brine includes a two-step chemical reaction that produces a solid sodium bicarbonate ($NaHCO_3$) product and calcium chloride ($CaCl_2$) solution with no net ammonia consumption. Carbon dioxide mineralization using reject brine may be particularly useful in reducing the discharge of $CO_2$ into the atmosphere, where underground storage is not feasible.

Figure 1:
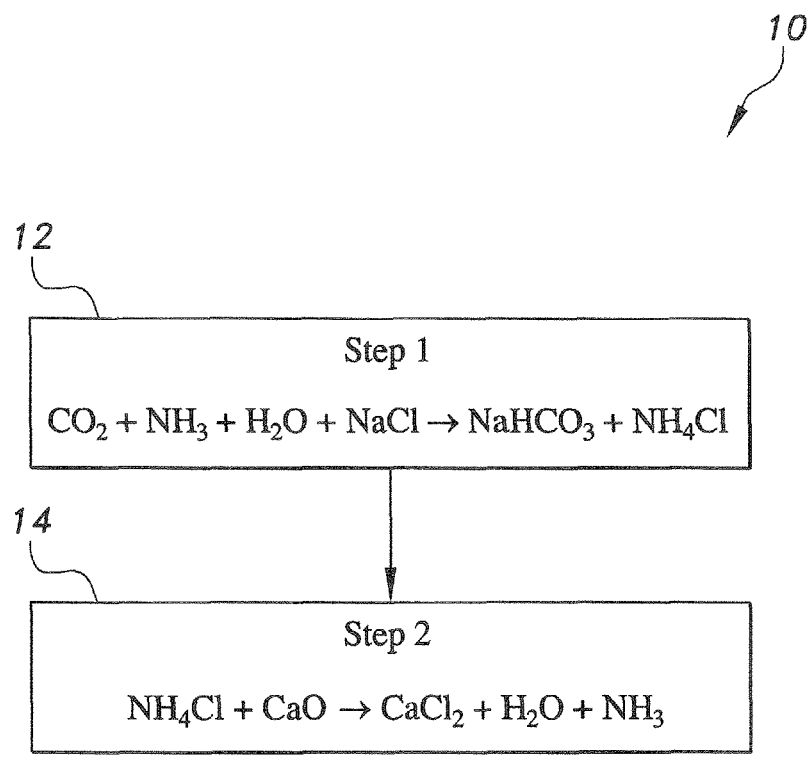
FIG. 1 is a flowchart showing the two-step chemical reaction scheme for carbon dioxide ($CO_2$) mineralization using reject brine according to the present invention.

The two-step chemical reaction process 10 is shown in FIG. 1. In the first step 12 of the two-step chemical reaction process 10, captured $CO_2$ and sodium chloride from reject brine (as well as other salts which may be present in the brine) are reacted in the presence of ammonia to produce a stable sodium bicarbonate ($NaHCO_3$) solid product and an aqueous ammonium chloride ($NH_4Cl$) solution. The first step 12 may occur in a first chamber or reactor. The aqueous $NH_4Cl$ solution from the first step may then be directed to a second chamber and reacted with calcium oxide (CaO) in a second step (ammonia recycling or recovery step) 14 to produce calcium chloride solution and ammonia. In this manner, carbon dioxide mineralization using reject brine may simultaneously convert carbon dioxide and sodium chloride into sodium bicarbonate and calcium chloride solution, with little to no net ammonia consumption. For example, at least 90%, i.e., 95%, 99%, 99.99%, or 100%, of ammonia may be released from $NH_4Cl$ in the second step of the reaction and recycled to ammoniate additional reject brine.

Figure 2:
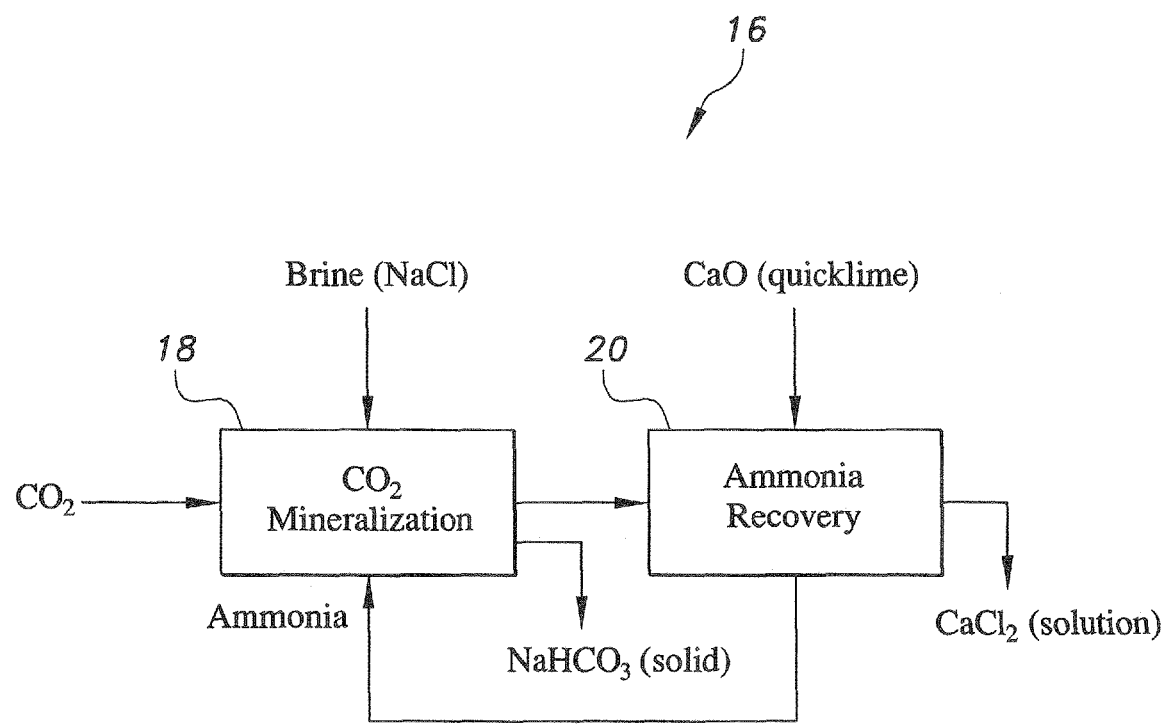
FIG. 2 is a block diagram showing $CO_2$ mineralization and ammonia recovery process for carbon dioxide ($CO_2$) mineralization using reject brine according to the present invention.

FIG. 2 illustrates the process of $CO_2$ mineralization using reject brine 16, including the $CO_2$ mineralization step 18 and the ammonia recovery step 20. As shown in FIG. 2, the $CO_2$ captured from emissions and the reject brine including NaCl may be reacted in a first chemical reactor 10 in the presence of ammonia. For example, the ammonia may be introduced in the first reactor 10 prior to the reject brine to facilitate appropriate mixing of the ammonia and the reject brine. The $CO_2$ may then be introduced to the ammoniated brine. The reject brine may have an initial sodium concentration of 57,000-113,000, for example, 57,000, 85,000 or 113,000 ppm (the reject brine has a higher NaCl concentration than seawater, having been concentrated during the desalination process). The $CO_2$ and NaCl may be reacted in the first chemical reactor 18 at low temperatures and ambient pressure, with good prospects near ambient conditions. For example, the first step of the reaction may occur at temperatures ranging from about 25° C. to about 40° C. Optimal sodium conversion (99.98%) may be achieved at a temperature of about 30° C. Sodium bicarbonate produced from the first reaction may be collected and the aqueous ammonium chloride solution may be fed into a second reactor 20.

The second step of the reaction is preferably conducted at a temperature range of 85-100° C. In the second step of the reaction, CaO (quicklime) may be added to the second reactor 20 to promote a second chemical reaction that yields calcium chloride solution. Preferably, the CaO is added to the second reactor 20 before introducing the aqueous ammonium chloride solution into the second reactor 20 to prevent or minimize slaking the lime. When the residual ammonium chloride solution ($NH_4Cl$) is reacted with CaO, ammonia is released. The second step of the reaction may release virtually all ammonia from ammonium chloride, and the ammonia may be channeled back into the first reactor 10 for reuse.

$CO_2$ mineralization using reject brine facilitates brine reject desalination simultaneously with reduction of carbon emissions by chemically reacting $CO_2$ and salt in the brine in the presence of a reagent that can activate the stable $CO_2$ molecule. The present inventor has determined the kinetics and optimum conditions for this complex chemical reaction using ammonia as the reagent. The present inventor has determined that solubility of sodium bicarbonate ($NaHCO_3$) is an important consideration in identifying the optimal conditions for conversion of $CO_2$ and NaCl. Sodium bicarbonate is soluble in water and only precipitates after reaching saturation level. The solubility depends on temperature. Before attaining saturation level, sodium bicarbonate remains in ionic for i.e., ($Na^+$) and ($HCO_3^-$). After reaching saturation levels, sodium bicarbonate precipitates. Further, the carbon mineralization reaction (step 1) is spontaneous for the temperature range between 0 and 50° C. (negative Gibbs free energy). However, this reaction is more spontaneous at lower temperatures. The reaction is also exothermic, thus requiring cooling to remove the heat of reaction and control the reaction temperature.

It was further found that the ammonia recovery step (step 2) is spontaneous for the temperature range between 20 and 100° C. (negative Gibbs free energy). The reaction is also exothermic, thus requiring a means of removal of the heat of reaction and control of the reaction temperature. The present inventor has further determined how to recycle the added ammonia reagent to make the proposed reaction economically feasible on a commercial scale while achieving low temperature $CO_2$ conversion into minerals that are either less harmful than the original gas and/or marketable products.

The following examples illustrate the present teachings. The following describes the experimental procedures used in the examples that follow.

Example 1

Solubility of Sodium Bicarbonate as a Function of Temperature

The solubility pattern of sodium bicarbonate is particularly important, since sodium bicarbonate is the major product and will remain in solution, instead of precipitating, prior to reaching saturation levels. Table 1 depicts the solubility of sodium bicarbonate as a function of temperature.

TABLE 1

$NaHCO_3$ solubility data with temperature

| Temperature (C.) | Solubility (g of $NaHCO_3$ /L of water) |
|---|---|
| 0 | 68.7 |
| 5 | 74.1 |
| 10 | 81.1 |
| 15 | 87.9 |
| 20 | 95.3 |
| 25 | 102.7 |
| 30 | 110 |
| 35 | 117.7 |
| 40 | 125.4 |
| 45 | 133.5 |
| 50 | 141.9 |

Example 2

Sodium Conversion

The chemical conversion of $CO_2$ into sodium bicarbonate $NaHCO_3$ according to the reaction scheme shown in FIG. 1 was carried out in a first batch reactor over a period of 180 minutes. The reactor was designed and built according to preliminary tests done in a transparent glass bubble column reactor. The transparency of the glass reactor facilitated monitoring of the reaction, namely, mixing patterns and solid bicarbonate precipitation as a function of reaction temperature. This was important for identifying the incipient solid product precipitation, as this same product is soluble up to the saturation level shown in Table 1. Once the saturation level was reached, precipitation was clearly visible within the glass reactor. The extent and pattern of mixing in the reactor solution due to the feed $CO_2$ gas was also visualized in the glass reactor. The preliminary observations and data gathered with the glass reactor enabled the detailed design of a stainless steel reactor (SS grade 316). The reactor walls had a smooth surface to facilitate the flow pattern of the gas and solid particles formed and aggregated prior to settling on precipitation.

The $CO_2$ conversion reaction was thoroughly investigated within the temperature range of 25° C. to 40° C. at 5° C. intervals. The feed brine concentrations investigated were 57,000 (Table 2), 85,000 (Table 3) and 113,000 ppm (Table 4). The choice of such salt concentrations was motivated by the complex nature of solubility of sodium chloride (feed solution) and sodium bicarbonate (product). The mass ratio of ammonia ($NH_3$) to sodium (Na) was 1.123:1. Ammonia was in the form of solution (specific gravity 0.88 or 35% wt). $CO_2$ gas was fed to the first reactor at a constant flow of 2 liters per minute throughout experimental runs. The gas purity was 99.9%. Experimental runs were conducted over a period of 180 minutes under the various conditions shown in Tables 2 to 4, yielding the sodium conversions shown. The reaction was monitored throughout the batch time by means of sample collection at time intervals (as shown in the Tables 2-4) from the reactor, followed by chemical analysis (ICP for sodium analysis), pH and conductivity measurements.

TABLE 2

Na conversion for Na initial concentration of 57000 ppm

| Time | Conversion (%) at different temperatures | | | |
|---|---|---|---|---|
| (min) | 25° C. | 30° C. | 35° C. | 40° C. |
| 0 | 0 | 0 | 0 | 0 |
| 30 | 53.31 | 59.55 | 64.57 | 64.59 |
| 60 | 94.18 | 97.36 | 93.90 | 67.66 |
| 90 | 98.50 | 98.08 | 96.19 | 85.64 |
| 120 | 98.41 | 98.61 | 96.36 | 87.76 |
| 150 | 98.32 | 97.99 | 93.94 | 87.59 |
| 180 | 97.95 | 98.36 | 95.06 | 88.57 |

TABLE 3

Na conversion for Na initial concentration of 85000 ppm

| | Conversion (%) at different temperatures | | | |
|---|---|---|---|---|
| Time (min) | 25° C. | 30° C. | 35° C. | 40° C. |
| 0 | 0 | 0.00 | 0 | 0 |
| 30 | 37.60 | 43.78 | 49.6 | 44.24 |
| 60 | 58.25 | 83.39 | 85.39 | 49.16 |
| 90 | 91.26 | 95.43 | 96.07 | 72.96 |
| 120 | 92.31 | 98.52 | 96.08 | 87.61 |
| 150 | 93.35 | 98.71 | 96.52 | 85.71 |
| 180 | 94.94 | 99.98 | 96.73 | 87.15 |

TABLE 4

Na conversion at Na initial concentration of 113000 ppm at varied temperatures

| Time | Conversion (%) at different temperatures | | | |
|---|---|---|---|---|
| (min) | 25° C. | 30° C. | 35° C. | 40° C. |
| 0 | 0 | 0 | 0.00 | 0.00 |
| 30 | 35.10 | 25.91 | 33.56 | — |
| 60 | 70.33 | 90.50 | 54.04 | 78.54 |
| 90 | 88.35 | 87.70 | 90.8 | 83.07 |
| 120 | 88.82 | 88.58 | 93.52 | 82.99 |
| 150 | 91.62 | 91.00 | 94.04 | 83.03 |
| 180 | 87.83 | 93.95 | 93.82 | 83.11 |

Figure 5:
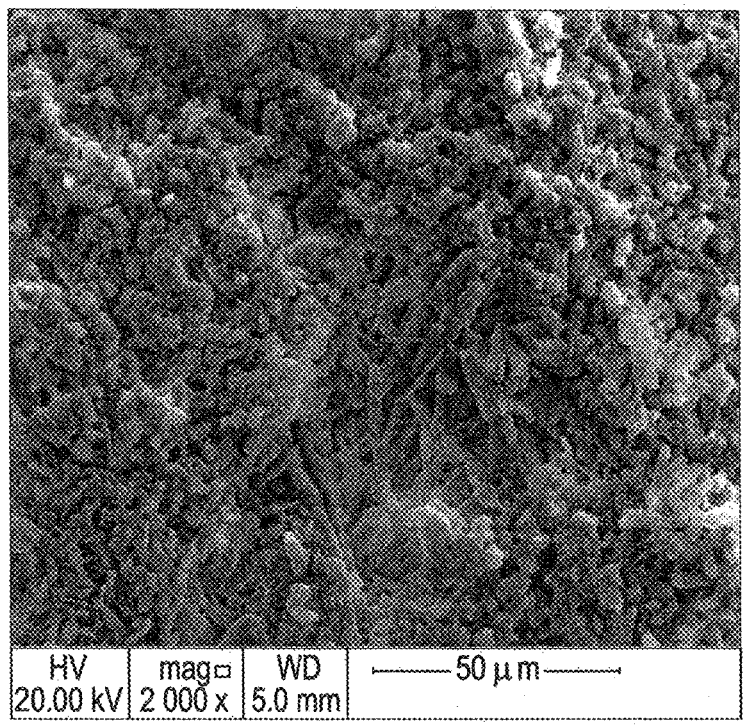
FIG. 5 shows SEM imaging of the dried, precipitated sodium bicarbonate product obtained by carbon dioxide ($CO_2$) mineralization using reject brine according to the present invention.
Figure 6:
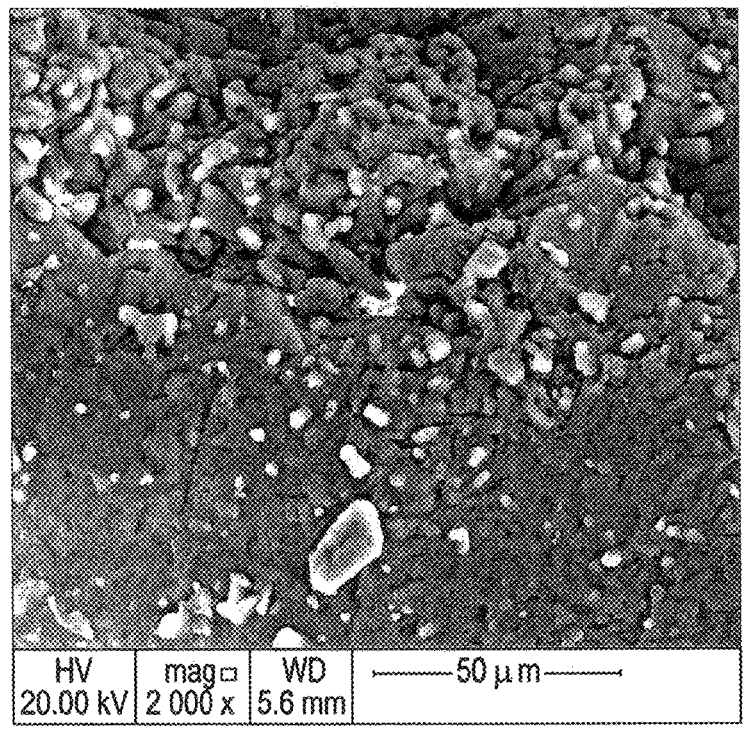
FIG. 6 shows SEM imaging of a reference sample of analytical grade sodium bicarbonate for comparison with FIG. 5.

These experiments clearly indicated that the optimum conditions that yielded the highest sodium conversion of 99.98% were a temperature of 30° C. and an initial sodium concentration of 85,000 ppm. This important result can be adapted to a continuous reactor by using an equivalent reactor residence time instead of batch reaction time. The amount of $CO_2$ converted can easily be computed from the reaction stoichiometry shown in FIG. 1. The precipitate product sodium bicarbonate was positively identified using standard analytical methods and SEM imaging of the solid particles (FIGS. 5-6). It should be understood that the purity of the solid precipitate will depend on the initial brine solution, e.g., whether the initial brine solution was synthetic (purely NaCl) or seawater desalination reject brine.

Example 3

Ammonia Recycle Reaction

Figure 3:
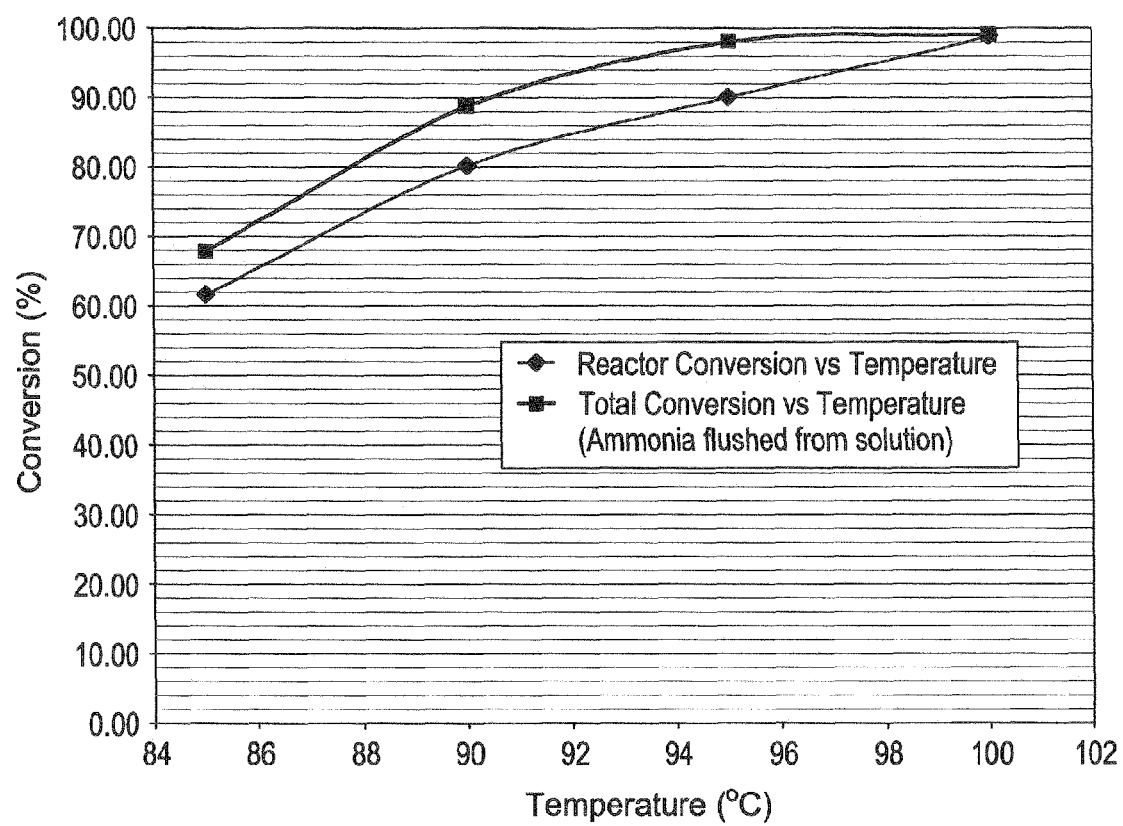
FIG. 3 is a graph showing temperature dependency of ammonium chloride conversion in carbon dioxide ($CO_2$) mineralization using reject brine according to the present invention where the conversion occurs in an excess of ammonium chloride.
Figure 4:
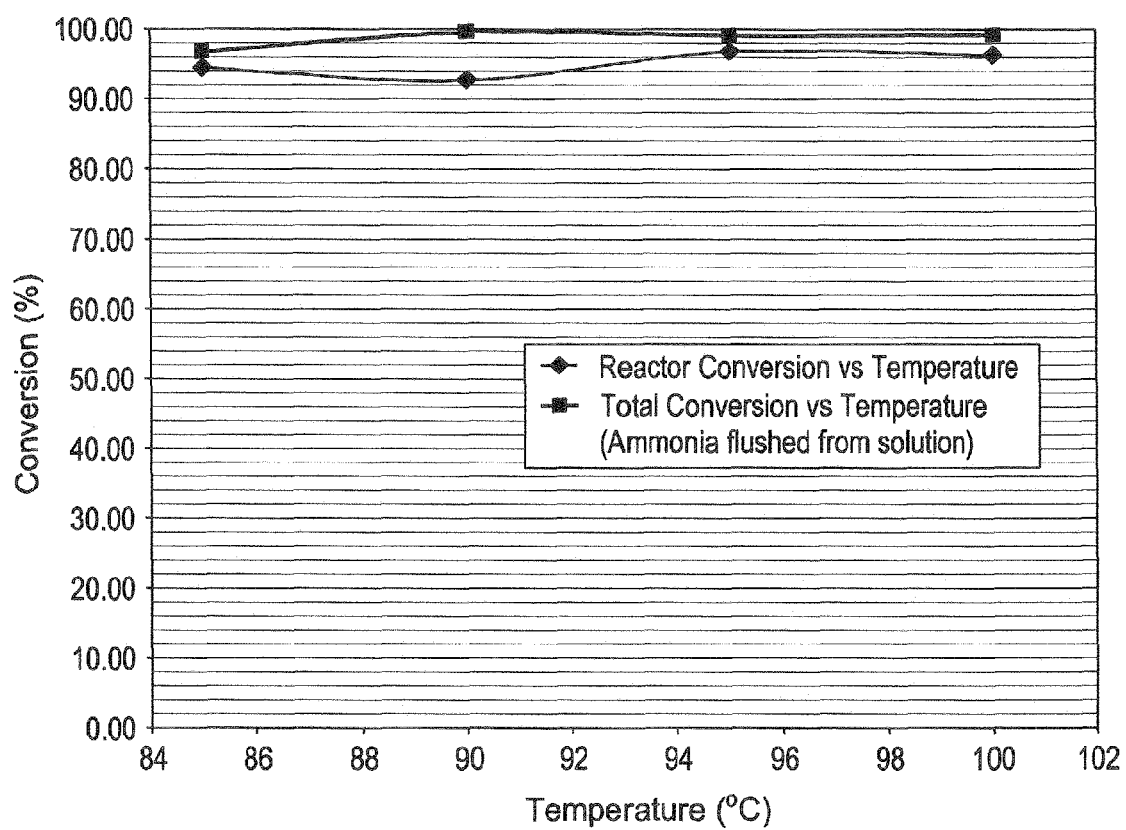
FIG. 4 is a graph showing temperature dependency of ammonium chloride conversion according to the present invention where the conversion occurs in an excess of calcium oxide.

The ammonia recycle reaction shown in FIG. 1 (step 2) was studied in a jacketed stirred tank reactor. The solid CaO was added to the solution of $NH_4Cl$ to ensure that the CaO dissolves in the solution (it is important to add the solid CaO to the aqueous $NH_4Cl$, rather than the reverse, since adding $NH_4Cl(aq)$ to CaO(s) may lead to the formation of $Ca(OH)_2$, which would not dissolve in solution). The thermodynamic studies pointed at a temperature range of 85° to 100° C. Campaigns of runs involving various temperatures and stoichiometries (7.5% mol excess of $NH_4Cl$ in some runs and 20% mol excess of CaO in other runs) were carried out to identify optimum conditions. $N_2$ gas was introduced as a sweep gas to facilitate the flow of $NH_3$ gas from reactor to gas washing bottles, where ammonia reacts with acid for determination. The final results are depicted in FIGS. 3 and 4, where excess ammonium chloride and excess quicklime were used, respectively. The highest conversions of $NH_4Cl$ to ammonia was achieved under CaO excess at the temperature range of about 90-100° C. The conversion achieved was 99.99%, indicating that ammonia can be recycled completely.

It is to be understood that the present invention is not limited to the embodiments described above, but encompasses any and all embodiments within the scope of the following claims.

I claim:

1. A process for carbon dioxide ($CO_2$) mineralization using reject brine, comprising the steps of:
   (a) introducing ammonia into a first reaction chamber;
   (b) obtaining reject brine discharged from a desalination plant, the reject brine having sodium chloride (NaCl);
   (c) mixing the reject brine with the ammonia in the first chamber to form ammoniated brine;
   (d) capturing $CO_2$ emitted from a chemical or power plant wherein the $CO_2$ is 99.9% pure;
   (e) dissolving the captured $CO_2$ with the ammoniated brine in the first chamber and maintaining a temperature between 25° C. and 40° C. in the first chamber to precipitate sodium bicarbonate ($NaHCO_3$) and form an aqueous ammonium chloride ($NH_4Cl$) solution and wherein the % sodium conversion is about 95% or greater;
   (f) transferring the aqueous ammonium chloride ($NH_4Cl$) solution from the first chamber into a second reaction chamber;
   (g) adding calcium oxide (CaO) to the aqueous ammonium chloride ($NH_4Cl$) solution in the second chamber to form a calcium chloride solution and ammonia.

2. The process for carbon dioxide mineralization according to claim 1, wherein the step of dissolving the captured $CO_2$ with the ammoniated brine further comprises maintaining a temperature of about 30° C. in the first chamber.

3. The process for carbon dioxide mineralization according to claim 1, wherein the reject brine has an initial sodium concentration ranging from 57,000 to 113,000 ppm.

4. The process for carbon dioxide mineralization according to claim 1, wherein the reject brine has an initial sodium concentration of about 85,000 ppm.

5. The process for carbon dioxide mineralization according to claim 1, wherein the step of adding calcium oxide (CaO) to the aqueous ammonium chloride ($NH_4Cl$) solution further comprises maintaining a temperature between 90° C. and 100° C. in the second chamber.

6. The process for carbon dioxide mineralization according to claim 1, wherein at least 90% of the ammonia is released from the aqueous ammonium chloride ($NH_4Cl$) solution.

7. The process for carbon dioxide mineralization using reject brine according to claim 1, wherein at least 99% of the ammonia is released from the aqueous ammonium chloride ($NH_4Cl$) solution.

8. The process for carbon dioxide mineralization using reject brine according to claim 1, further comprising the step of transferring ammonia produced from reaction of the calcium oxide with ammonium chloride from the second chamber back into the first chamber for mixing with additional reject brine.

9. The process for carbon dioxide mineralization using reject brine according to claim 1, wherein the conversion of $CO_2$ to $NaHCO_3$ occurs within about 180 minutes.

10. The process for carbon dioxide mineralization using reject brine according to claim 1, wherein the conversion of $CO_2$ to $NaHCO_3$ occurs within about 150 minutes.

11. The process for carbon dioxide mineralization using reject brine according to claim 1, wherein the conversion of $CO_2$ to $NaHCO_3$ occurs within about 120 minutes.

12. The process for carbon dioxide mineralization using reject brine according to claim 1, wherein the conversion of $CO_2$ to $NaHCO_3$ occurs within about 90 minutes.

13. The process for carbon dioxide mineralization using reject brine according to claim 1, wherein the CaO is added in mol excess.

14. The process for carbon dioxide mineralization using reject brine according to claim 13, wherein the CaO is added in 20% mol excess.

15. The process for carbon dioxide mineralization using reject brine according to claim 10, wherein the $NH_4Cl$ is added in 7.5% mol excess.

\* \* \* \* \*